United States Patent
Li

(10) Patent No.: US 11,243,668 B2
(45) Date of Patent: Feb. 8, 2022

(54) USER INTERACTIVE METHOD AND APPARATUS FOR CONTROLLING PRESENTATION OF MULTIMEDIA DATA ON TERMINALS

(71) Applicant: TENCENT TECHNOLOGY (SHENZHEN) COMPANY LIMITED, Guangdong (CN)

(72) Inventor: Yufei Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1159 days.

(21) Appl. No.: 15/165,693

(22) Filed: May 26, 2016

(65) Prior Publication Data

US 2016/0274754 A1   Sep. 22, 2016

Related U.S. Application Data

(63) Continuation of application No. PCT/CN2015/074310, filed on Mar. 16, 2015.

(30) Foreign Application Priority Data

Mar. 19, 2014 (CN) .......................... 201410102358.5

(51) Int. Cl.
*G06F 3/0484* (2013.01)
*G06Q 30/02* (2012.01)
(Continued)

(52) U.S. Cl.
CPC ............ *G06F 3/0484* (2013.01); *G06F 3/012* (2013.01); *G06F 3/017* (2013.01); *G06F 3/0304* (2013.01);
(Continued)

(58) Field of Classification Search
CPC .... G06F 3/0484; G06F 3/04883; G06F 3/017; G06F 3/0304; G06F 3/0482; G06F 3/14;
(Continued)

(56) References Cited

U.S. PATENT DOCUMENTS 8,473,336 B1 *   6/2013   Simmons ............... G06Q 30/00
                                                        705/14.1
8,566,152 B1 *  10/2013   Shaw .................. G06Q 30/0256
                                                        705/14.1
(Continued)

FOREIGN PATENT DOCUMENTS

CN         1541478 A    10/2004
CN       101002472 A     7/2007
(Continued)

OTHER PUBLICATIONS

International Search Report in international application No. PCT/CN2015/074310, dated Jun. 19, 2015.
(Continued)

*Primary Examiner* — Jennifer N Welch
*Assistant Examiner* — Reji Kartholy
(74) *Attorney, Agent, or Firm* — Anova Law Group, PLLC

(57) ABSTRACT

A method and an apparatus for controlling presentation of multimedia data belong to the field of Internet technologies. The method includes: presenting multimedia data, and displaying an interaction interface corresponding to the multimedia data; acquiring verification information input by a user through the interaction interface; and skipping, if the verification information is correct, presentation of the multimedia data. The apparatus includes: a presentation module, a display module, an acquisition module, and a control module.

20 Claims, 7 Drawing Sheets

(51) Int. Cl.
*G06F 3/14* (2006.01)
*G06F 40/166* (2020.01)
*H04M 1/724* (2021.01)
*G06F 3/01* (2006.01)
*G06F 3/03* (2006.01)
*G06F 3/0482* (2013.01)
*G06F 3/0488* (2013.01)
*G06F 3/16* (2006.01)

(52) U.S. Cl.
CPC ........ *G06F 3/0482* (2013.01); *G06F 3/04883* (2013.01); *G06F 3/14* (2013.01); *G06F 3/167* (2013.01); *G06F 40/166* (2020.01); *G06Q 30/02* (2013.01); *H04M 1/724* (2021.01)

(58) Field of Classification Search
CPC .......... G06F 3/167; G06F 3/012; G06F 17/24; G06F 40/166; H04M 1/72519; G06Q 30/02
See application file for complete search history.

(56) References Cited

U.S. PATENT DOCUMENTS

| | | | | |
|---|---|---|---|---|
| 8,885,882 | B1* | 11/2014 | Yin | G06F 3/00 382/103 |
| 2002/0046095 | A1* | 4/2002 | Wallace | G06Q 30/02 705/14.2 |
| 2003/0031455 | A1 | 2/2003 | Sagar | |
| 2006/0287912 | A1* | 12/2006 | Raghuvamshi | G06Q 30/02 705/14.4 |
| 2007/0266400 | A1* | 11/2007 | Rogers | H04N 7/162 725/42 |
| 2008/0032739 | A1* | 2/2008 | Hoodbhoy | G06Q 10/06 455/556.2 |
| 2008/0059519 | A1 | 3/2008 | Grifftih | |
| 2008/0114861 | A1* | 5/2008 | Gildred | H04N 21/8456 709/219 |
| 2008/0133321 | A1* | 6/2008 | Pennock | G06Q 30/02 705/14.54 |
| 2008/0133347 | A1* | 6/2008 | Josifovski | G06Q 30/02 705/14.44 |
| 2008/0133348 | A1* | 6/2008 | Reed | G06Q 30/02 705/14.49 |
| 2009/0226148 | A1 | 9/2009 | Nesvadba | |
| 2010/0211918 | A1* | 8/2010 | Liang | G06K 9/00335 715/863 |
| 2011/0112894 | A1* | 5/2011 | Tan | G06Q 30/0241 705/14.4 |
| 2011/0202946 | A1* | 8/2011 | Block | H04L 65/4092 725/13 |
| 2011/0219403 | A1* | 9/2011 | Nesamoney | H04N 7/025 725/34 |
| 2012/0158461 | A1* | 6/2012 | Aldrey | G06Q 30/0201 705/7.35 |
| 2012/0166294 | A1* | 6/2012 | Lieberman | G06Q 30/0276 705/14.72 |
| 2012/0323700 | A1* | 12/2012 | Aleksandrovich | G06F 21/36 705/14.69 |
| 2013/0054820 | A1* | 2/2013 | Reisman | G06F 16/954 709/227 |
| 2013/0080263 | A1* | 3/2013 | Goldman | G06Q 30/02 705/14.69 |
| 2013/0091027 | A1* | 4/2013 | Lin | G06Q 30/0251 705/14.73 |
| 2013/0239140 | A1* | 9/2013 | Demirtshian | H04N 5/44513 725/37 |
| 2013/0311276 | A1* | 11/2013 | Wong, Jr. | G06Q 30/0251 705/14.49 |
| 2013/0311309 | A1* | 11/2013 | Napchi | G06Q 30/0277 705/14.73 |
| 2014/0026048 | A1* | 1/2014 | Spirer | G06F 3/0484 715/716 |
| 2014/0059663 | A1* | 2/2014 | Rajshekar | G06F 21/31 726/6 |
| 2014/0080110 | A1* | 3/2014 | Nguyen | G09B 7/00 434/362 |
| 2014/0172542 | A1* | 6/2014 | Poncz | G06Q 30/0252 705/14.43 |
| 2015/0170204 | A1* | 6/2015 | Inbar | G06Q 30/02 705/14.55 |
| 2016/0219332 | A1* | 7/2016 | Asbun | H04N 21/42201 |

FOREIGN PATENT DOCUMENTS

| | | |
|---|---|---|
| CN | 101291499 A | 10/2008 |
| CN | 102520853 A | 6/2012 |
| CN | 102594734 A | 7/2012 |
| CN | 102663609 A | 9/2012 |
| CN | 102752453 A | 10/2012 |
| CN | 102841754 A | 12/2012 |
| CN | 104036408 A | 9/2014 |
| WO | 2011101653 A1 | 8/2011 |

OTHER PUBLICATIONS

English Translation of the Written Opinion of the International Search Authority in international application No. PCT/CN2015/074310, dated Jun. 19, 2015.
Notification of the Second Office Action of Chinese application No. 201410102358.5, dated Jan. 29, 2018.
English translation of the Notification of the First Office Action of Chinese application No. 201410102358.5 , dated May 18, 2017.

\* cited by examiner

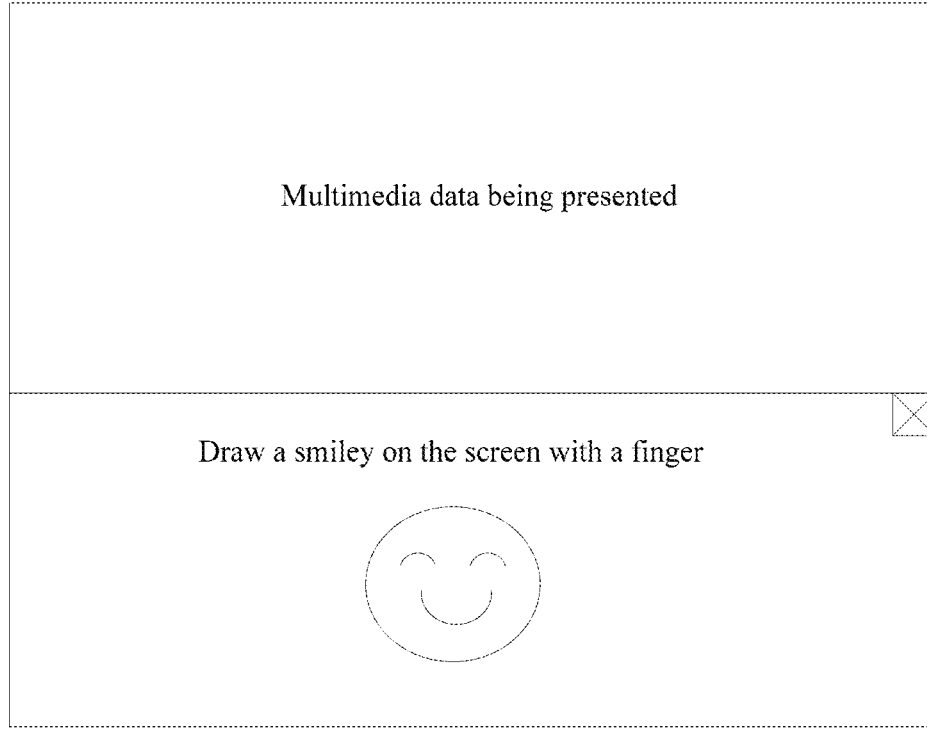

USER INTERACTIVE METHOD AND APPARATUS FOR CONTROLLING PRESENTATION OF MULTIMEDIA DATA ON TERMINALS

CROSS REFERENCE TO RELATED APPLICATIONS

This is a continuation application of International Patent Application No. PCT/CN2015/074310, filed on Mar. 16, 2015, which claims priority to Chinese Patent Application No. 201410102358.5 filed on Mar. 19, 2014, the disclosures of which are incorporated herein by reference in their entirety.

FIELD OF THE TECHNOLOGY

The present disclosure relates to the field of Internet technologies, and in particular, to a method and an apparatus for controlling presentation of multimedia data.

BACKGROUND OF THE DISCLOSURE

With the high-speed development and improvement of the Internet, a growing number of users start using network services. Before a user is provided with a network service, some multimedia data usually needs to be presented, so as to promote a relevant product in the multimedia data for the user. After the multimedia data has been presented, the user is then provided with the network service. Because different methods for controlling presentation of multimedia data bring different benefits, a more proper method for controlling presentation of multimedia data needs to be selected according to a practical condition.

A method for controlling presentation of multimedia data is provided in the existing technology. In the method, all multimedia data to be presented is presented in order. When one piece of multimedia data has been presented, a next piece of multimedia data is selected for presentation, until all multimedia data has been presented.

In a process of implementing the present disclosure, the inventor finds that the foregoing method at least has the following problems:

Every time before a user is provided with a network service, multimedia data needs to be presented. However, the user may already know something about content in the presented multimedia data. In such a case, the user needs to wait till the multimedia data that the user already knows has been presented to use the subsequent network service, which undesirably consumes time of the user. In this case, the user may start to focus on other things instead of the presented multimedia data, and leave the multimedia data until the multimedia data has been presented to use the subsequent network service, resulting in that the presented multimedia data fails to achieve an objective of promoting a relevant product. Therefore, a manner of controlling presentation of multimedia data is not sufficiently flexible, resulting in an undesirable effect of presenting multimedia data.

SUMMARY

According to an aspect, a method for controlling presentation of multimedia data is provided, where the method includes:

presenting multimedia data, and displaying an interaction interface corresponding to the multimedia data;

acquiring verification information input by a user through the interaction interface; and skipping, if the verification information is correct, presentation of the multimedia data.

According to another aspect, an apparatus for controlling presentation of multimedia data is provided, where the apparatus includes:

a presentation module, configured to present multimedia data; a display module, configured to display an interaction interface corresponding to the multimedia data;

an acquisition module, configured to acquire verification information input by a user through the interaction interface; and a control module, configured to skip, if the verification information is correct, presentation of the multimedia data.

BRIEF DESCRIPTION OF THE DRAWINGS

To illustrate the technical solutions in the embodiments of the present invention more clearly, drawings required in description of the embodiments will be introduced simply in the following. It is obvious that the drawings in the following description are only some of the embodiments of the present invention, and a person of ordinary skill in the art may obtain other drawings based on the drawings without creative efforts.

FIG. 3 is a schematic diagram of an interface provided in Embodiment 2 of the present invention;

FIG. 4 is a schematic diagram of a first interaction interface provided in Embodiment 2 of the present invention;

DESCRIPTION OF EMBODIMENTS

To make the objectives, technical solutions, and advantages in the present disclosure clearer, the following further describes the implementation manners of the present disclosure in detail with reference to the accompanying drawings.

Embodiment 1

Every time before a user is provided with a network service, all multimedia data to be presented needs to be presented in order. However, the user may already know something about content in the presented multimedia data. In such a case, the user needs to wait till the multimedia data that the user already knows has been presented to use the subsequent network service, which undesirably consumes time of the user. In this case, the user may start to focus on other things instead of the presented multimedia data, and leave the multimedia data until the multimedia data has been presented to use the subsequent network service, resulting in that the presented multimedia data fails to achieve an objective of promoting a relevant product. Therefore, a manner of controlling presentation of multimedia data is not sufficiently flexible, resulting in an undesirable effect of presenting multimedia data. For example, a user requests to watch a network video, and before the network video is played, several advertisements are usually played first. These advertisements are played in order, until all the advertisements have been played. If the user already knows something about content in the advertisements, in such a case, the user still needs to wait till all the advertisements have been played to watch the requested network video, which undesirably consumes time of the user. In this case, the user may choose to browse other web pages and leave the advertisements until the advertisements have been played to watch the requested network video, resulting in that the advertisements that are played fail to achieve an objective of promoting a relevant product, and therefore, an effect of presenting an advertisement is undesirable.

Figure 1:
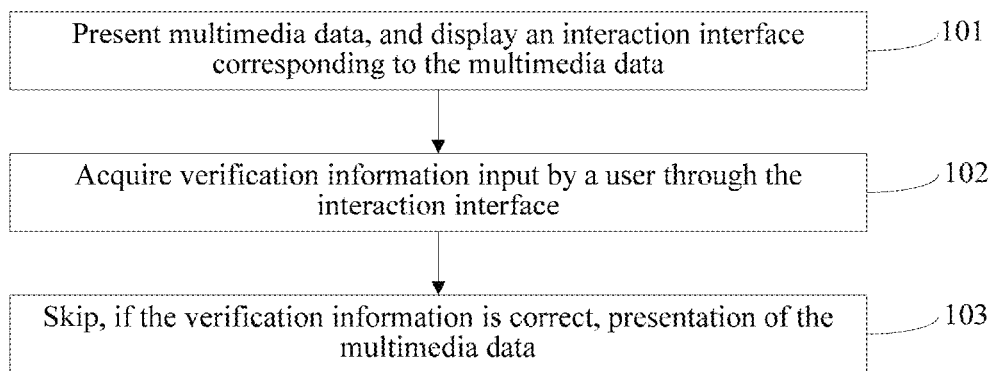
FIG. 1 is a flow chart of a method for controlling presentation of multimedia data provided in Embodiment 1 of the present invention.

To prevent the foregoing case and improve an effect of presenting multimedia data, an embodiment of the present invention provides a method for controlling presentation of multimedia data. The method is applicable to a terminal. The terminal includes, but is not limited to, a mobile phone, a computer, a tablet computer, and the like. Referring to FIG. 1, a procedure of the method provided in this embodiment includes:

101: Present Multimedia Data, and Display an Interaction Interface Corresponding to the Multimedia Data.

As an optional embodiment, the displaying an interaction interface corresponding to the multimedia data, includes, but is not limited to:

displaying, if a touch operation is detected on an interface presenting the multimedia data or a time of presenting the multimedia data reaches a preset time, the interaction interface corresponding to the multimedia data.

As an optional embodiment, the displaying an interaction interface corresponding to the multimedia data, includes, but is not limited to:

displaying a first interaction interface corresponding to the multimedia data, where the first interaction interface at least includes optional document information; and acquiring verification information input by a user through the interaction interface includes, but is not limited to:

acquiring document information selected by the user from the optional document information included in the first interaction interface, and using the document information selected by the user as the verification information input through the interaction interface.

Alternatively, the displaying an interaction interface corresponding to the multimedia data, includes, but is not limited to:

displaying a second interaction interface corresponding to the multimedia data, where the second interaction interface at least includes document information for prompting input of speech information; and acquiring verification information input by a user through the interaction interface includes, but is not limited to:

collecting speech information input, according to the document information in the second interaction interface, by the user, and using the speech information as the verification information input through the interaction interface.

Alternatively, the displaying an interaction interface corresponding to the multimedia data, includes, but is not limited to:

displaying a third interaction interface corresponding to the multimedia data, where the third interaction interface at least includes a text box for inputting text information; and acquiring verification information input by a user through the interaction interface includes, but is not limited to:

acquiring text information input by the user in the text box in the third interaction interface, and using the text information as the verification information input through the interaction interface.

Alternatively, the displaying an interaction interface corresponding to the multimedia data, includes, but is not limited to:

displaying a fourth interaction interface corresponding to the multimedia data, where the fourth interaction interface at least includes document information for prompting input of specified image information; and acquiring verification information input by a user through the interaction interface includes, but is not limited to:

acquiring image information input, according to the document information in the fourth interaction interface, by the user, and using the image information as the verification information input through the interaction interface.

Alternatively, the displaying an interaction interface corresponding to the multimedia data, includes, but is not limited to:

displaying a fifth interaction interface corresponding to the multimedia data, where the fifth interaction interface at least includes document information prompting photographing of a specified expression; and acquiring verification information input by a user through the interaction interface includes, but is not limited to:

photographing image data according to the document information displayed in the fifth interaction interface, and using the image data as the verification information input through the interaction interface.

Alternatively, the displaying an interaction interface corresponding to the multimedia data, includes, but is not limited to:

displaying a sixth interaction interface corresponding to the multimedia data, where the sixth interaction interface at least includes document information prompting a body motion; and acquiring verification information input by a user through the interaction interface includes, but is not limited to:

capturing a body motion of the user triggered according to the document information in the sixth interaction interface, and using the body motion as the verification information input through the interaction interface.

102: Acquire Verification Information Input by a User Through the Interaction Interface.

As an optional embodiment, after the acquiring verification information input by a user through the interaction interface, the method further includes:

sending the verification information to a verification server, receiving a verification result of verification on the verification information returned by the verification server, and determining, according to the verification result returned by the verification server, whether the verification information is correct;

or, comparing the verification information with locally prestored standard information, and determining, according to a comparison result, whether the verification information is correct.

103: Skip, if the Verification Information is Correct, Presentation of the Multimedia Data.

As an optional embodiment, after the displaying an interaction interface corresponding to the multimedia data, the method further includes:

displaying a close option on the interaction interface, and closing, after it is detected that the close option is selected, the interaction interface corresponding to the multimedia data;

or, closing, after the skipping presentation of the multimedia data, the interaction interface corresponding to the multimedia data.

For the method provided in this embodiment, an interaction interface corresponding to multimedia data is displayed, verification information input by a user through the interaction interface is acquired, it is verified whether the verification information is correct, and if the verification information is correct, presentation of the multimedia data is skipped. Because if the user can input the correct verification information, it indicates that the user knows something about the presented multimedia data, and in this case, the user may input the correct verification information to skip presentation of the multimedia data, thereby saving time of the user, and achieving an objective of promoting a relevant product. In addition, not only a manner of controlling presentation of multimedia data becomes more flexible, but also an effect of presenting multimedia data is further enhanced.

Embodiment 2

Figure 2:
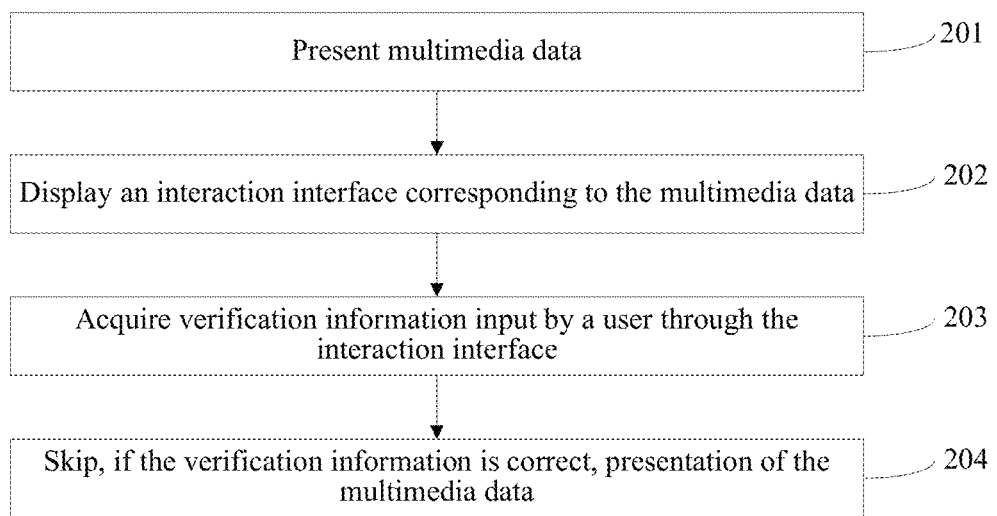
FIG. 2 is a flow chart of a method for controlling presentation of multimedia data provided in Embodiment 2 of the present invention.

An embodiment of the present invention provides a method for controlling presentation of multimedia data. The method provided in this embodiment is described with reference to the content of Embodiment 1. Referring to FIG. 2, a procedure of the method provided in this embodiment includes:

201: Present Multimedia Data.

The presented multimedia data may be a video, music, text, a Graphics Interchange Format (GIF) animation, and content of the presented multimedia data is not specifically limited in this embodiment. A presentation method for presenting multimedia data is also not specifically limited in this embodiment, and includes, but is not limited to: presenting, according to a format of presented multimedia data, the multimedia data in a preset presentation area on a screen. For example, if the format of the multimedia data is a video format, the video data may be played in the preset presentation area on the screen, and at the same time, a remaining playing time of the video data may further be displayed at an upper right corner of the presentation area.

202: Display an Interaction Interface Corresponding to the Multimedia Data.

The timing of displaying the multimedia data is not specifically limited in this embodiment, and includes, but is not limited to: displaying, if a touch operation is detected on an interface presenting the multimedia data or a time of presenting the multimedia data reaches a preset time, the interaction interface corresponding to the multimedia data.

A touch operation may be detected on a terminal that supports a touch screen, and a mouse click operation may be detected on a terminal that does not support a touch screen, which is not specifically limited in this embodiment. In addition, the length of the preset time may be determined according to the length of the presented multimedia data, which is also not specifically limited in this embodiment.

A manner of displaying an interaction interface corresponding to the multimedia data is also not specifically limited in this embodiment, and includes, but is not limited to: determining an interaction type and corresponding topical content, and displaying an interaction interface corresponding to the multimedia data according to the interaction type and the corresponding topical content.

The interaction type may be an interaction type template when a user inputs verification information subsequently, and the topical content corresponding to the interaction type may be a basic element, for example, text or an image, that is filled in the interaction type template when the interaction interface corresponding to the interaction type is generated, which are not specifically limited in this embodiment. For example, if interaction requires the user to input text manually, in this case, a text box may be set at a position in the interaction type template for the user to manually input text, and a descriptive label is set at another position. The descriptive label is used for being filled with the corresponding topical content. For example, a piece of text is filled in the descriptive label and used for prompting the user to input text in the text box.

When an interaction type and corresponding topical content are determined, the following two determination methods may be used:

Determination Method 1: Acquire an identifier corresponding to multimedia data; perform a local search according to the identifier corresponding to the multimedia data, and determine a corresponding interaction type identifier and corresponding topical content; and perform a local search according to the interaction type identifier again, so as to determine an interaction type corresponding to the interaction type identifier.

Each piece of multimedia data uniquely corresponds to one identifier. Because a correspondence between an identifier corresponding to multimedia data and an interaction type identifier and a correspondence between an interaction type identifier and an interaction type are prestored locally, a corresponding interaction type may be determined by using an identifier corresponding to multimedia data.

It should be noted that, because each piece of multimedia data may correspond to multiple interaction interfaces, that is, multiple interaction types, an identifier corresponding to each piece of multimedia data may correspond to multiple interaction type identifiers. Correspondingly, when a local search is performed according to the identifier corresponding to the multimedia data, multiple corresponding interaction type identifiers and corresponding topical content may be found, and in this case, a method of random selection may be used to determine a corresponding interaction type identifier and corresponding topical content. Certainly, other methods may further be used to determine a corresponding interaction type identifier and corresponding topical content, which is not specifically limited in this embodiment.

Determination Method 2: Acquire an identifier corresponding to multimedia data; send the identifier corresponding to the multimedia data to a cloud server, where the cloud server performs a search according to the identifier corresponding to the multimedia data; and receive an interaction type, an interaction type identifier, and corresponding topical content returned by the cloud server, and use the interaction type and the corresponding topical content returned by the cloud server as the determined interaction type and corresponding topical content.

Furthermore, to avoid acquisition from a side of the cloud server every time an interaction type and corresponding topical content are determined, after an interaction type, an interaction type identifier, and corresponding topical content are acquired, the acquired interaction type, the interaction type identifier, and the corresponding topical content may be stored locally to facilitate use a next time. Specifically, a method used to determine an interaction type and corresponding topical content after an acquired interaction type, interaction type identifier, and corresponding topical content are stored locally is not specifically limited in this embodiment, and includes, but is not limited to: acquiring an identifier corresponding to multimedia data; and performing a local search according to the identifier corresponding to the multimedia data, determining a corresponding interaction type identifier, and performing a local search according to the interaction type identifier, so as to determine a corresponding interaction type and corresponding topical content.

Because each piece of multimedia data may correspond to multiple interaction interfaces, that is, multiple interaction types, an identifier corresponding to each piece of multimedia data may correspond to multiple interaction type identifiers. Correspondingly, when performing a search according to the identifier corresponding to the multimedia data, the cloud server may find multiple corresponding interaction type identifiers. In this case, a certain method may be used to determine a corresponding interaction type identifier. For example, an interaction type identifier determined a previous time is recorded, and one interaction type identifier is selected from interaction type identifiers except the interaction type identifier determined the previous time, so as to ensure that an interaction type identifier determined a current time is different from that of the previous times. Certainly, other methods may further be used to determine a corresponding interaction type identifier, which are not specifically limited in this embodiment.

It should be noted that, different from the foregoing Determination Method 1, in Determination Method 2, when an interaction type and corresponding topical content are determined, an online manner is mainly used for acquisition from a network. Therefore, an interaction interface corresponding to each piece of multimedia data may have an update, that is, an interaction type and corresponding topical content corresponding to the multimedia data may be both changed, and the two cases are described below separately:

For a case in which an interaction type corresponding to multimedia data has an update, that is, the side of the cloud server has updated a new interaction type, in this case, if the cloud server has performed a search according to an identifier corresponding to multimedia data, the determined interaction type identifier is an interaction type identifier corresponding to a new interaction type. Because a side of a terminal does not store the interaction type and corresponding topical content locally, the cloud server may send the new interaction type, the interaction type identifier, and the corresponding topical content together to the terminal. Upon reception, the terminal uses the received interaction type identifier and corresponding topical content as the determined interaction type and corresponding topical content, and may locally store the received interaction type identifier and corresponding topical content at the same time.

For a case in which corresponding topical content has an update, if the cloud server has performed a search according to an identifier corresponding to multimedia data, the determined interaction type identifier is not an interaction type identifier corresponding to a new interaction type. In this case, the cloud server may determine that the interaction type corresponding to the interaction type identifier has been stored on the side of the terminal, and therefore, the cloud server needs to detect whether corresponding topical content has an update. If it is detected that the corresponding topical content has an update, the interaction type identifier and the updated corresponding topical content are sent to the terminal. The terminal receives the interaction type identifier and the updated corresponding topical content, performs a local search according to the interaction type identifier, then determines the interaction type corresponding to the interaction type identifier, and at the same time updates the interaction type locally.

Certainly, when an interaction type and corresponding topical content are determined, other determination methods may further be used, which are not specifically limited in this embodiment. No matter which manner of determining an interaction type and corresponding topical content is used, the displayed interaction interface corresponding to the multimedia data includes, but is not limited to, several below:

A first interaction interface: The first interaction interface at least includes optional document information.

A second interaction interface: The second interaction interface at least includes document information for prompting input of speech information.

A third interaction interface: The third interaction interface at least includes a text box for inputting text information.

A fourth interaction interface: The fourth interaction interface at least includes document information for prompting input of specified image information.

A fifth interaction interface: The fifth interaction interface at least includes document information prompting photographing of a specified expression.

A sixth interaction interface: The sixth interaction interface at least includes document information prompting a body motion.

Furthermore, after the interaction interface corresponding to the multimedia data is displayed, an interface for closing the interaction interface may further be provided for the user to close the interaction interface corresponding to the multimedia data, which is not specifically limited in this embodiment. For example, a close option may be displayed on the interaction interface corresponding to the multimedia data, and after it is detected that the close option is selected, the interaction interface corresponding to the multimedia data is closed. Certainly, other manners may further be provided for the user to close the interaction interface corresponding to the multimedia data, and a manner of closing an interaction interface corresponding to multimedia data is not specifically limited in this embodiment.

For example, as shown in FIG. 3, an interface in the upper half part in FIG. 3 is used for presenting multimedia data, an interface in the lower half part is an interaction interface corresponding to the multimedia data, and a close option is displayed at the upper right of the interaction interface. If the user does not intend to input verification information through the interaction interface, in this case, the user may click the close option at the upper right to close the interaction interface corresponding to the multimedia data.

203: Acquire Verification Information Input by a User Through the Interaction Interface.

A manner of acquiring verification information input by a user through the interaction interface is not specifically limited in this embodiment, and includes, but is not limited to: acquiring the verification information input, according to an operation form prompted in a displayed different interaction interface, by the user through the interaction interface.

A manner of acquiring verification information input, according to a displayed different interaction interface, by a user through the interaction interface includes, but is not limited to, several cases below:

A first case: If the displayed interaction interface corresponding to the multimedia data is a first interaction interface, the first interaction interface at least includes optional document information. In this case, document information selected by the user from the optional document information included in the first interaction interface is acquired, and the document information selected by the user is used as the verification information input through the interaction interface.

For example, an example in which the verification information is topical options of the multimedia data is used. As shown in FIG. 4, an interaction interface includes four options, and a check box is provided before each option for selection of a different option. An option is a correct topic of the multimedia data. If the user knows something about the multimedia data, the user should know the topic of the multimedia data to choose the correct answer.

A second case: If the displayed interaction interface corresponding to the multimedia data is a second interaction interface, the second interaction interface at least includes document information for prompting input of speech information. In this case, speech information input, according to the document information in the second interaction interface, by the user is collected, and the speech information is used as the verification information input through the interaction interface.

Figure 5:
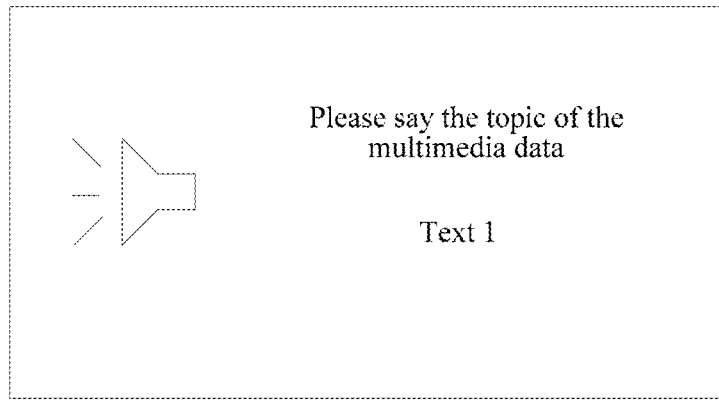
FIG. 5 is a schematic diagram of a second interaction interface provided in Embodiment 2 of the present invention.

For example, an example in which the verification information is speech information corresponding to the topic of the multimedia data is used. As shown in FIG. 5, text 1 displayed on an interaction interface is the topic of the multimedia data, the user may say the topic of the multimedia data according to the prompt on the interaction interface, and a terminal collects the corresponding speech information, so that the user can further understand and memorize the topic of the multimedia data.

A third case: If the displayed interaction interface corresponding to the multimedia data is a third interaction interface, the third interaction interface at least includes a text box for inputting text information. In this case, text information input by the user in the text box in the third interaction interface is acquired, and the text information is used as the verification information input through the interaction interface.

Figure 6:
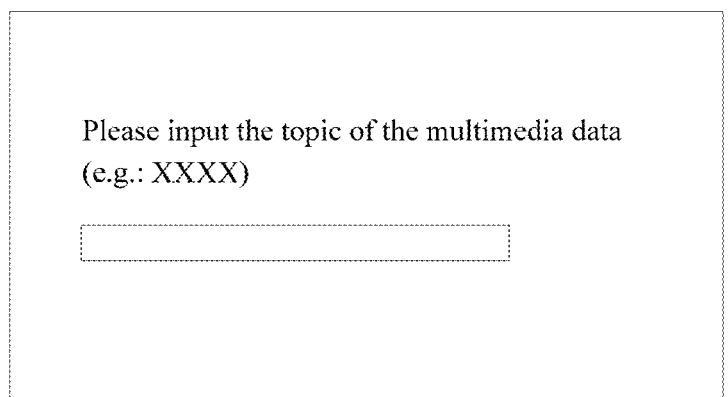
FIG. 6 is a schematic diagram of a third interaction interface provided in Embodiment 2 of the present invention.

For example, an example in which the verification information is text information corresponding to the topic of the multimedia data is used. As shown in FIG. 6, an interaction interface includes a text box for inputting text information, and the user may input the topic of the multimedia data according to the prompt on the interaction interface. Certainly, if the user knows something about the multimedia data, the user should be able to directly input the correct topic without a prompt.

A fourth case: If the displayed interaction interface corresponding to the multimedia data is a fourth interaction interface, the fourth interaction interface at least includes document information for prompting input of specified image information. In this case, image information input, according to the document information in the fourth interaction interface, by the user is acquired, and the image information is used as the verification information input through the interaction interface.

Figure 7:
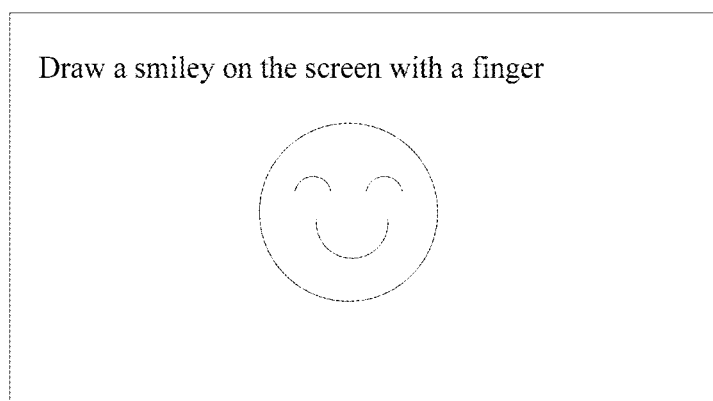
FIG. 7 is a schematic diagram of a fourth interaction interface provided in Embodiment 2 of the present invention.

For example, an example in which the verification information is specified image information is used. As shown in FIG. 7, the specified image information is a smiley image, and the user may draw a smiley image on the screen according to the prompt.

A fifth case: If the displayed interaction interface corresponding to the multimedia data is a fifth interaction interface, the fifth interaction interface at least includes document information prompting photographing of a specified expression. In this case, image data is photographed according to the document information displayed in the fifth interaction interface, and the image data is used as the verification information input through the interaction interface.

Figure 8:
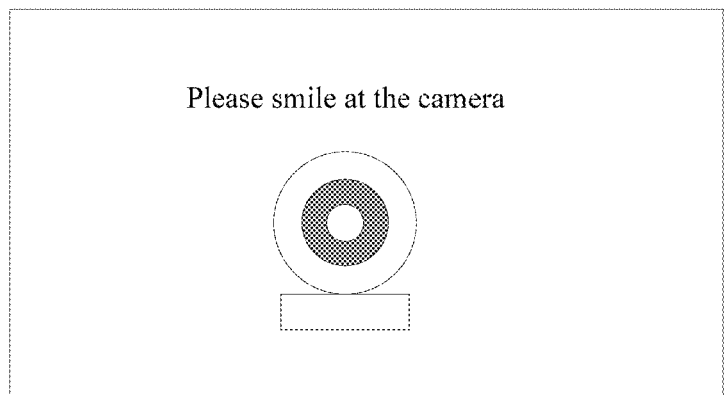
FIG. 8 is a schematic diagram of a fifth interaction interface provided in Embodiment 2 of the present invention.

For example, an example in which the verification information is image data corresponding to a specified expression is used. As shown in FIG. 8, the specified expression is a smile, the user may put on a specified expression to a camera according to the prompt, and the terminal collects corresponding image data.

A sixth case: If the displayed interaction interface corresponding to the multimedia data is a sixth interaction interface, the sixth interaction interface at least includes document information prompting a body motion. In this case, a body motion of the user triggered according to the document information in the sixth interaction interface is captured, and the body motion is used as the verification information input through the interaction interface.

Figure 9:
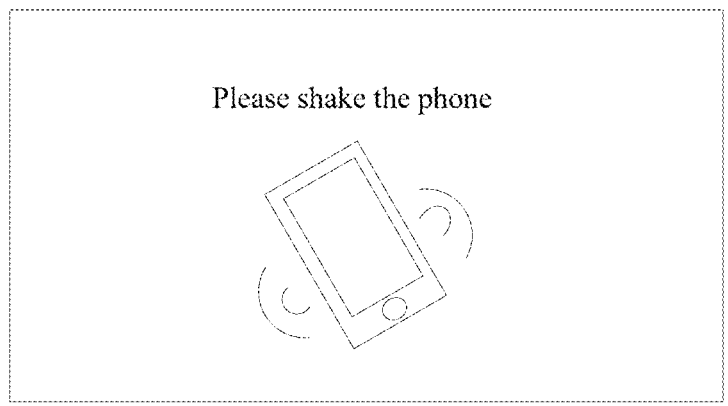
FIG. 9 is a schematic diagram of a sixth interaction interface provided in Embodiment 2 of the present invention.

For example, an example in which the verification information is a rotating angular velocity corresponding to a body motion is used. As shown in FIG. 9, the user may shake the terminal according to the prompt. In this case, a device, for example, a gyroscope, for capturing a body motion in the terminal may acquire a rotating angular velocity corresponding to a shaking motion.

Certainly, the verification information input by the user through the interaction interface may further be acquired in other operation forms, which are not specifically limited in this embodiment.

Furthermore, after the verification information input by the user through the interaction interface is acquired, the verification information input by the user through the interaction interface may further be verified, and a method of verifying whether the verification information is correct is not specifically limited in this embodiment, and includes, but is not limited to, the following two methods:

Verification Method 1: Send the verification information to a verification server, receive a verification result of verification on the verification information returned by the verification server, and determine, according to the verification result returned by the verification server, whether the verification information is correct.

Verification Method 2: Compare the verification information with locally prestored standard information, and determine, according to a comparison result, whether the verification information is correct.

Regardless of whether the verification information is verified by the verification server or the verification information is verified locally, a following verification method may be used: verifying the verification information according to a form of the verification information.

The verification information acquired in step 203 is used as an example. For the first case above, if the verification information is topical options of the multimedia data, in this case, the correct topical option may be stored locally or on a side of the verification server in advance, an acquired option is compared, and if the options are consistent, it is determined that the verification information is correct.

For the second case above, if the verification information is speech information corresponding to the topic of the multimedia data, in this case, collected speech information may be identified locally or on a side of the verification server, and if it is identified that text corresponding to the speech information is the topic of the multimedia data, it is determined that the verification information is correct.

For the third case above, if the verification information is text information corresponding to the topic of the multimedia data, in this case, correct text information may be stored locally or on a side of the verification server in advance, acquired text information is compared with the correct text information, and if a comparison result is that the acquired text information is consistent with the correct text information, it is determined that the verification information is correct.

For the fourth case above, if the verification information is specified image information, in this case, acquired image information may be identified locally or on a side of the verification server, and if it is identified that features in the image information meet features in the specified image information, it is determined that the verification information is correct.

For the fifth case above, if the verification information is image data corresponding to a specified expression, in this case, collected image data may be identified locally or on a side of the verification server, and if it is identified that features in the image data meet features in the image data corresponding to the specified expression, it is determined that the verification information is correct.

For the sixth case above, if the verification information is a rotating angular velocity corresponding to a body motion, in this case, a rotating angular velocity corresponding to a captured motion may be determined locally or on a side of the verification server, and if it is determined that the value of the rotating angular velocity is between preset threshold values, it is determined that the verification information is correct.

204: Skip, if the Verification Information is Correct, Presentation of the Multimedia Data.

A manner of skipping presentation of the multimedia data is not specifically limited in this embodiment, and includes, but is not limited to: skipping directly, after it is determined that the verification information input by the user is correct, presentation of this piece of multimedia data, detecting whether there is still subsequent multimedia data, and if there is still subsequent multimedia data, continuing control of presentation of the subsequent multimedia data on the basis of the foregoing procedure, until there is no subsequent multimedia data.

Furthermore, after presentation of the multimedia data is skipped, because the interaction interface corresponding to the multimedia data has acquired the verification information input by the user, to save a presentation space, the interaction interface corresponding to the multimedia data may further be closed. A manner of closing the interaction interface of the multimedia data is not specifically limited in this embodiment, and includes, but is not limited to that: after presentation of the multimedia data is skipped, the interaction interface corresponding to the multimedia data immediately disappears from a presentation interface in a drop-down manner. Certainly, according to visual experience of the user, after presentation of the multimedia data is skipped, other manners may further be used to close the interaction interface corresponding to the multimedia data, which are also not specifically limited in this embodiment.

Because when the user knows about current presented multimedia data, the user can input correct verification information to skip presentation of the multimedia data, so that the user is motivated to learn of and memorize a relevant product in the multimedia data. In addition, when the user does not know about current presented multimedia data, the user may not know corresponding verification information, and in this case, the user may raise a query or start a discussion in a social manner, which may objectively improve the awareness of a relevant product in the multimedia data.

For the method provided in this embodiment, an interaction interface corresponding to multimedia data is displayed, verification information input by a user through the interaction interface is acquired, it is verified whether the verification information is correct, and if the verification information is correct, presentation of the multimedia data is skipped. Because if the user can input the correct verification information, it indicates that the user knows something about the presented multimedia data, and in this case, the user may input the correct verification information to skip presentation of the multimedia data, thereby saving time of the user, and achieving an objective of promoting a relevant product. In addition, not only a manner of controlling presentation of multimedia data becomes more flexible, but also an effect of presenting multimedia data is further enhanced.

Embodiment 3

Figure 10:
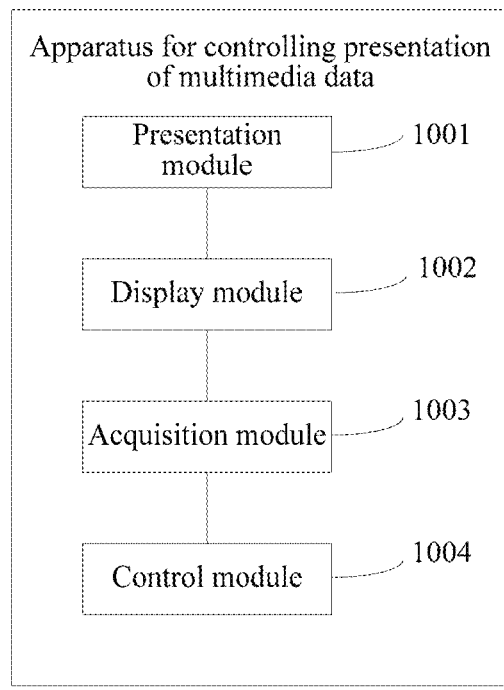
FIG. 10 is a schematic structural diagram of a first apparatus for controlling presentation of multimedia data provided in Embodiment 3 of the present invention.

An embodiment of the present invention provides an apparatus for controlling presentation of multimedia data. The apparatus is configured to execute the method for controlling presentation of multimedia data provided in Embodiment 1 or Embodiment 2 above. Referring to FIG. 10, the apparatus includes:

a presentation module 1001, configured to present multimedia data;

a display module 1002, configured to display an interaction interface corresponding to the multimedia data;

an acquisition module 1003, configured to acquire verification information input by a user through the interaction interface; and a control module 1004, configured to skip, when the verification information is correct, presentation of the multimedia data.

As a preferred embodiment, the display module 1002 is configured to display, when a touch operation is detected on an interface presenting the multimedia data or a time of presenting the multimedia data reaches a preset time, the interaction interface corresponding to the multimedia data.

As a preferred embodiment, the display module 1002 is configured to display a first interaction interface corresponding to the multimedia data, where the first interaction interface at least includes optional document information.

The acquisition module 1003 is configured to acquire document information selected by the user from the optional document information included in the first interaction interface, and use the document information selected by the user as the verification information input through the interaction interface.

Alternatively, the display module 1002 is configured to display a second interaction interface corresponding to the multimedia data, where the second interaction interface at least includes document information for prompting input of speech information.

The acquisition module 1003 is configured to collect speech information input, according to the document information in the second interaction interface, by the user, and use the speech information as the verification information input through the interaction interface.

Alternatively, the display module 1002 is configured to display a third interaction interface corresponding to the multimedia data, where the third interaction interface at least includes a text box for inputting text information.

The acquisition module 1003 is configured to acquire text information input by the user in the text box in the third interaction interface, and use the text information as the verification information input through the interaction interface.

Alternatively, the display module 1002 is configured to display a fourth interaction interface corresponding to the multimedia data, where the fourth interaction interface at least includes document information for prompting input of specified image information.

The acquisition module 1003 is configured to acquire image information input, according to the document information in the fourth interaction interface, by the user, and use the image information as the verification information input through the interaction interface.

Alternatively, the display module 1002 is configured to display a fifth interaction interface corresponding to the multimedia data, where the fifth interaction interface at least includes document information prompting photographing of a specified expression.

The acquisition module 1003 is configured to photograph image data according to the document information displayed in the fifth interaction interface, and use the image data as the verification information input through the interaction interface.

Alternatively, the display module 1002 is configured to display a sixth interaction interface corresponding to the multimedia data, where the sixth interaction interface at least includes document information prompting a body motion.

The acquisition module 1003 is configured to capture a body motion of the user triggered according to the document information in the sixth interaction interface, and use the body motion as the verification information input through the interaction interface.

Figure 11:
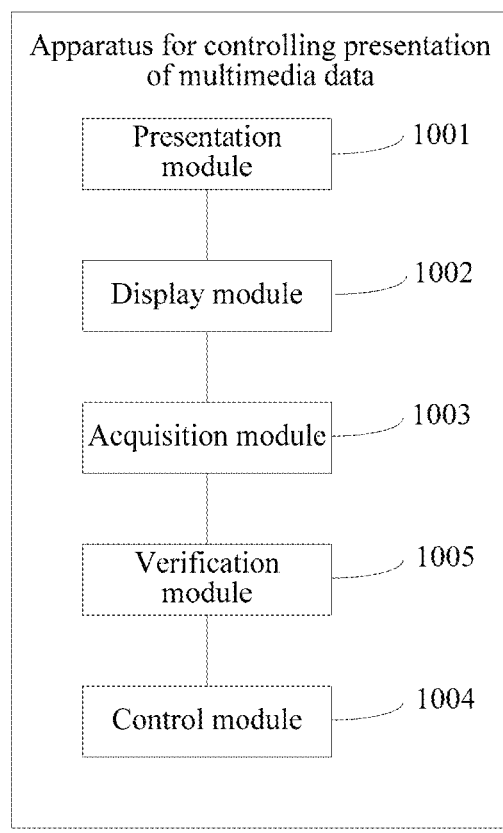
FIG. 11 is a schematic structural diagram of a second apparatus for controlling presentation of multimedia data provided in Embodiment 3 of the present invention.

As a preferred embodiment, referring to FIG. 11, the apparatus further includes: a verification module 1005.

As a preferred embodiment, the verification module 1005 includes:

a sending unit, configured to send the verification information to a verification server;

a receiving unit, configured to receive a verification result of verification on the verification information returned by the verification server; and a first determination unit, configured to determine, according to the verification result returned by the verification server, whether the verification information is correct;

or, the verification module 1005 includes:

a comparison unit, configured to compare the verification information with locally prestored standard information; and a second determination unit, configured to determine, according to a comparison result, whether the verification information is correct.

Figure 12:
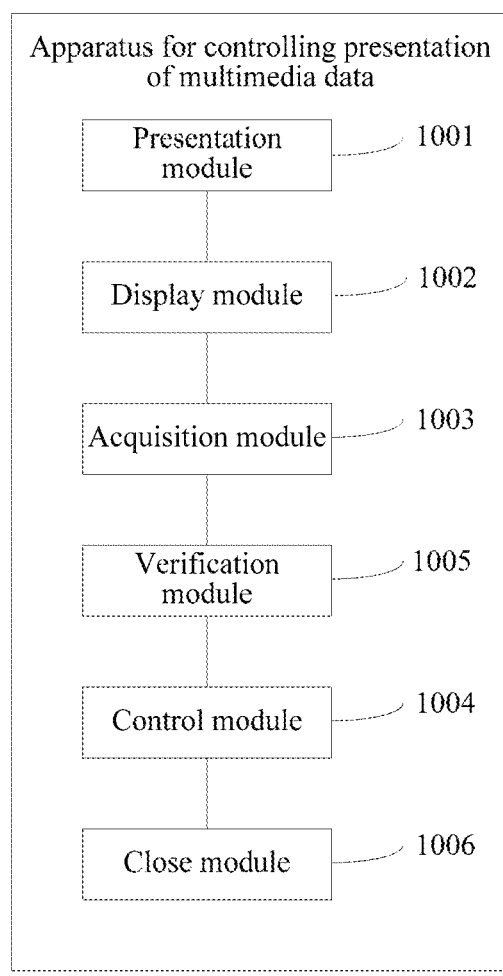
FIG. 12 is a schematic structural diagram of a third apparatus for controlling presentation of multimedia data provided in Embodiment 3 of the present invention.

As a preferred embodiment, referring to FIG. 12, the apparatus further includes: a close module 1006.

As a preferred embodiment, the close module 1006 is configured to display a close option on the interaction interface, and close, after it is detected that the close option is selected, the interaction interface corresponding to the multimedia data;

or, the close module 1006 is configured to close, after presentation of the multimedia data is skipped, the interaction interface corresponding to the multimedia data.

For the apparatus provided in this embodiment, an interaction interface corresponding to multimedia data is displayed, verification information input by a user through the interaction interface is acquired, it is verified whether the verification information is correct, and if the verification information is correct, presentation of the multimedia data is skipped. Because if the user can input the correct verification information, it indicates that the user knows something about the presented multimedia data, and in this case, the user may input the correct verification information to skip presentation of the multimedia data, thereby saving time of the user, and achieving an objective of promoting a relevant product. In addition, not only a manner of controlling presentation of multimedia data becomes more flexible, but also an effect of presenting multimedia data is further enhanced.

Embodiment 4

Figure 13:
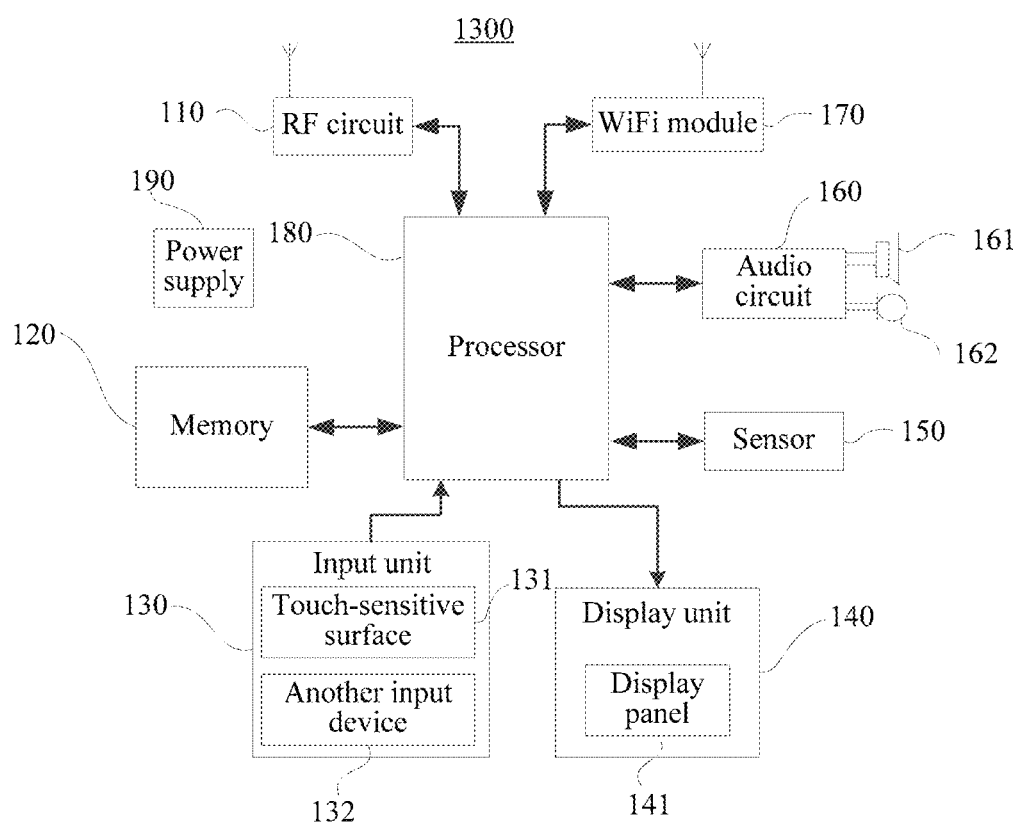
FIG. 13 is a schematic structural diagram of a terminal provided in Embodiment 4 of the present invention.

A terminal is provided in this embodiment. The terminal may be configured to execute the method for controlling presentation of multimedia data in the foregoing embodiments. Referring to FIG. 13, the terminal 1000 includes:

The terminal 1300 may include components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the prior art may understand that, the structure of the terminal 1300 shown in FIG. 13 does not constitute any limitation on the terminal, and may include components more or less than those shown in the figure, or a combination of some components, or different component layouts.

The RF circuit 110 may be used to receive and send information or receive and send a signal during a call, and in particular, after receiving downlink information of a base station, hand over the downlink information to one or more processors 180 for processing; and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LAN), and a duplexer. In addition, the RF circuit 110 may further communicate with a network and another device by using wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), e-mail, a short messaging service (SMS), and the like.

The memory 120 may be configured to store a software program and a module, and the processor 180 runs the software program and the module stored in the memory 120 to implement various functional applications and data processing. The memory 120 may mainly include a program storage area and a data storage area. The program storage area can store an operating system, an application program required by at least one function (such as a voice playback function and an image playback function), and the like. The data storage area may store data (such as audio data and an address book) created according to use of the terminal 1300. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by a user or information provided to a user, and various graphical user interfaces of the terminal 1300, where these graphical user interfaces may be formed by a graph, a text, an icon, a video, and any combination thereof. The display unit 140 may include a display panel 141. Optionally, the display panel 141 may be configured in the form of a liquid crystal display (LCD), an organic light-emitting diode (OLED), or the like. Further, the touch sensitive surface 131 may cover the display panel 141. After detecting a touch operation on or near the touch sensitive surface 131, the touch sensitive surface 131 transfers the touch operation to the processor 180, so as to determine a type of a touch event. Subsequently, the processor 180 provides corresponding visual output on the display panel 141 according to the type of the touch event. In FIG. 13, the touch sensitive surface 131 and the display panel 141 are used as two separate parts to implement input and output functions; however, in some embodiments, the touch sensitive surface 131 and the display panel 141 may be integrated to implement the input and output functions.

The terminal 1300 may further include at least one sensor 150, for example, an optical sensor, a motion sensor, and other sensors. Specifically, the optical sensor may include an ambient light sensor and a proximity sensor, where the ambient light sensor may adjust the luminance of the display panel 141 according to brightness of the ambient light, and the proximity sensor may switch off the display panel 141 and/or backlight when the terminal 1300 is moved near an ear. As one type of the motion sensor, a gravity acceleration sensor may detect the magnitude of accelerations in various directions (which generally are triaxial), may detect the magnitude and direction of the gravity when the sensor is still, may be configured to identify an application of a mobile phone gesture (for example, switching between landscape and portrait modes, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the terminal 1300 device 400 are not further described herein.

The audio circuit 160, a loudspeaker 161, and a microphone 162 may provide audio interfaces between the user and the terminal 1300. The audio circuit 160 may transmit, to the loudspeaker 161, a received electric signal converted from received audio data. The loudspeaker 161 converts the electrical signal into a sound signal for output. On the other hand, the microphone 162 converts a collected sound signal into an electrical signal. The audio circuit 160 receives the electrical signal and converts the electrical signal into audio data, outputs the audio data to the processor 180 for processing. Next, the processor 180 sends the audio data to another terminal 1300 by using the RF circuit 110, or outputs the audio data to the memory 120 for further processing. The audio circuit 160 may further include an earplug jack, so as to provide communication between a peripheral earphone and the terminal 1300.

The WiFi belongs to a short range wireless transmission technology. The terminal 1300 may help, by using a WiFi module 170, the user receive and send an e-mail, browse a webpage, access a streaming medium, and the like, and the WiFi provides the user with wireless broadband Internet access. Although FIG. 13 shows the WiFi module 170, it may be understood that, the WiFi module 170 is not an essential part of the terminal 1300, and can be completely omitted as required without changing the nature of the present disclosure.

The processor 180 is a control center of the terminal, and connects various parts of a whole mobile phone by using various interfaces and circuits. By running or executing the software program and/or the module stored in the memory 120 and invoking data stored in the memory 120, the processor 180 performs various functions and data processing of the terminal 1300, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like, and the modem mainly processes wireless communication. It may be understood that, the foregoing modem may also be not integrated into the processor 180.

The terminal 1300 further includes the power supply 190 (such as a battery) for supplying power to the components. Preferably, the power supply may be logically connected to the processor 180 by using a power supply management system, thereby implementing functions such as charging, discharging, and power consumption management by using the power supply management system. The power supply 190 may further include any component, such as one or more direct current or alternate current power supplies, recharging systems, power supply fault detection circuits, power supply converters or inverters, and power supply state indicators.

Although not shown in the figure, the terminal 1300 may further include a camera, a Bluetooth module, and the like, which are not further described herein. Specifically, in this embodiment, the display unit of the terminal is a touch screen display, and the terminal further includes a memory and one or more programs. The one or more programs are stored in the memory, and configured to be executed by one or more processors. The one or more programs include instructions used to perform the following operations:

presenting multimedia data, and displaying an interaction interface corresponding to the multimedia data;

acquiring verification information input by a user through the interaction interface; and skipping, if the verification information is correct, presentation of the multimedia data.

It is assumed that the foregoing is a first possible implementation manner, and in a second possible implementation manner provided on the basis of the first possible implementation manner, the memory of the terminal further includes an instruction for executing the following operations:

displaying, if a touch operation is detected on an interface presenting the multimedia data or a time of presenting the multimedia data reaches a preset time, the interaction interface corresponding to the multimedia data.

In a third possible implementation manner provided on the basis of the first possible implementation manner, the memory of the terminal further includes an instruction for executing the following operation:

displaying, a first interaction interface corresponding to the multimedia data, where the first interaction interface at least includes optional document information; and the acquiring verification information input by a user through the interaction interface includes:

acquiring document information selected by the user from the optional document information included in the first interaction interface, and using the document information selected by the user as the verification information input through the interaction interface;

or, the displaying an interaction interface corresponding to the multimedia data includes:

displaying a second interaction interface corresponding to the multimedia data, where the second interaction interface at least includes document information for prompting input of speech information; and the acquiring verification information input by a user through the interaction interface includes:

collecting speech information input, according to the document information in the second interaction interface, by the user, and using the speech information as the verification information input through the interaction interface;

or, the displaying an interaction interface corresponding to the multimedia data includes:

displaying a third interaction interface corresponding to the multimedia data, where the third interaction interface at least includes a text box for inputting text information; and the acquiring verification information input by a user through the interaction interface includes:

acquiring text information input by the user in the text box in the third interaction interface, and using the text information as the verification information input through the interaction interface;

or, the displaying an interaction interface corresponding to the multimedia data includes:

displaying a fourth interaction interface corresponding to the multimedia data, where the fourth interaction interface at least includes document information for prompting input of specified image information; and the acquiring verification information input by a user through the interaction interface includes:

acquiring image information input, according to the document information in the fourth interaction interface, by the user, and using the image information as the verification information input through the interaction interface;

or, the displaying an interaction interface corresponding to the multimedia data includes:

displaying a fifth interaction interface corresponding to the multimedia data, where the fifth interaction interface at least includes document information prompting photographing of a specified expression;

the acquiring verification information input by a user through the interaction interface includes:

photographing image data according to the document information displayed in the fifth interaction interface, and using the image data as the verification information input through the interaction interface;

or, the displaying an interaction interface corresponding to the multimedia data includes:

displaying a sixth interaction interface corresponding to the multimedia data, where the sixth interaction interface at least includes document information prompting a body motion; and the acquiring verification information input by a user through the interaction interface includes:

capturing a body motion of the user triggered according to the document information in the sixth interaction interface, and using the body motion as the verification information input through the interaction interface.

In a fourth possible implementation manner provided on the basis of the first possible implementation manner, the memory of the terminal further includes an instruction for executing the following operation:

sending the verification information to a verification server, receiving a verification result of verification on the verification information returned by the verification server, and determining, according to the verification result returned by the verification server, whether the verification information is correct;

or, comparing the verification information with locally prestored standard information, and determining, according to a comparison result, whether the verification information is correct.

In a fifth possible implementation manner provided on the basis of any possible implementation manner of the first possible implementation manner to the fourth possible implementation manner, the memory of the terminal further includes an instruction for executing the following operation:

displaying a close option on the interaction interface, and closing, after it is detected that the close option is selected, the interaction interface corresponding to the multimedia data;

or, closing, after the skipping presentation of the multimedia data, the interaction interface corresponding to the multimedia data.

For the terminal provided in the present disclosure, an interaction interface corresponding to multimedia data is displayed, verification information input by a user through the interaction interface is acquired, it is verified whether the verification information is correct, and if the verification information is correct, presentation of the multimedia data is skipped. Because if the user can input the correct verification information, it indicates that the user knows something about the presented multimedia data, and in this case, the user may input the correct verification information to skip presentation of the multimedia data, thereby saving time of the user, and achieving an objective of promoting a relevant product. In addition, not only a manner of controlling presentation of multimedia data becomes more flexible, but also an effect of presenting multimedia data is further enhanced.

Embodiment 5

An embodiment of the present invention further provides a computer readable storage medium. The computer readable storage medium may be a computer readable storage medium included in the memory in the foregoing embodiment; or may also be a computer readable storage medium that exists separately and is not assembled in a terminal. The computer readable storage medium stores one or more programs, and the one or more programs are executed by one or more processors to implement a method for controlling presentation of multimedia data, where the method includes:

presenting multimedia data, and displaying an interaction interface corresponding to the multimedia data;

acquiring verification information input by a user through the interaction interface; and skipping, if the verification information is correct, presentation of the multimedia data.

It is assumed that the foregoing is a first possible implementation manner, in a second possible implementation manner provided on the basis of the first possible implementation manner, the displaying an interaction interface corresponding to the multimedia data includes:

displaying, if a touch operation is detected on an interface presenting the multimedia data or a time of presenting the multimedia data reaches a preset time, the interaction interface corresponding to the multimedia data.

In a third possible implementation manner provided on the basis of the first possible implementation manner, the displaying an interaction interface corresponding to the multimedia data includes:

displaying, a first interaction interface corresponding to the multimedia data, where the first interaction interface at least includes optional document information; and the acquiring verification information input by a user through the interaction interface includes:

acquiring document information selected by the user from the optional document information included in the first interaction interface, and using the document information selected by the user as the verification information input through the interaction interface;

or, the displaying an interaction interface corresponding to the multimedia data includes:

displaying a second interaction interface corresponding to the multimedia data, where the second interaction interface at least includes document information for prompting input of speech information;

and the acquiring verification information input by a user through the interaction interface includes:

collecting speech information input, according to the document information in the second interaction interface, by the user, and using the speech information as the verification information input through the interaction interface;

or, the displaying an interaction interface corresponding to the multimedia data includes:

displaying a third interaction interface corresponding to the multimedia data, where the third interaction interface at least includes a text box for inputting text information; and the acquiring verification information input by a user through the interaction interface includes:

acquiring text information input by the user in the text box in the third interaction interface, and using the text information as the verification information input through the interaction interface;

or, the displaying an interaction interface corresponding to the multimedia data includes:

displaying a fourth interaction interface corresponding to the multimedia data, where the fourth interaction interface at least includes document information for prompting input of specified image information; and the acquiring verification information input by a user through the interaction interface includes:

acquiring image information input, according to the document information in the fourth interaction interface, by the user, and using the image information as the verification information input through the interaction interface;

or, the displaying an interaction interface corresponding to the multimedia data includes:

displaying a fifth interaction interface corresponding to the multimedia data, where the fifth interaction interface at least includes document information prompting photographing of a specified expression; and the acquiring verification information input by a user through the interaction interface includes:

photographing image data according to the document information displayed in the fifth interaction interface, and using the image data as the verification information input through the interaction interface;

or, the displaying an interaction interface corresponding to the multimedia data includes:

displaying a sixth interaction interface corresponding to the multimedia data, where the sixth interaction interface at least includes document information prompting a body motion; and the acquiring verification information input by a user through the interaction interface includes:

capturing a body motion of the user triggered according to the document information in the sixth interaction interface, and using the body motion as the verification information input through the interaction interface.

In a fourth possible implementation manner provided on the basis of the first possible implementation manner, after the acquiring verification information input by a user through the interaction interface, the method further includes:

sending the verification information to a verification server, receiving a verification result of verification on the verification information returned by the verification server, and determining, according to the verification result returned by the verification server, whether the verification information is correct;

or, comparing the verification information with locally prestored standard information, and determining, according to a comparison result, whether the verification information is correct.

In a fifth possible implementation manner provided on the basis of any possible implementation manner of the first possible implementation manner to the fourth possible implementation manner, after the displaying an interaction interface corresponding to the multimedia data, the method further includes:

displaying a close option on the interaction interface, and closing, after it is detected that the close option is selected, the interaction interface corresponding to the multimedia data;

or, closing, after the skipping presentation of the multimedia data, the interaction interface corresponding to the multimedia data.

For the computer readable storage medium provided in the embodiment of the present invention, an interaction interface corresponding to multimedia data is displayed, verification information input by a user through the interaction interface is acquired, it is verified whether the verification information is correct, and if the verification information is correct, presentation of the multimedia data is skipped. Because if the user can input the correct verification information, it indicates that the user knows something about the presented multimedia data, and in this case, the user may input the correct verification information to skip presentation of the multimedia data, thereby saving time of the user, and achieving an objective of promoting a relevant product. In addition, not only a manner of controlling presentation of multimedia data becomes more flexible, but also an effect of presenting multimedia data is further enhanced.

Embodiment 6

An embodiment of the present invention provides a graphical user interface. The graphical user interface is used on a terminal, and the terminal includes a touchscreen display, a memory, and one or more processors configured to execute one or more programs. The graphical user interface is configured to:

present multimedia data, and display an interaction interface corresponding to the multimedia data;

acquire verification information input by a user through the interaction interface; and skip, if the verification information is correct, presentation of the multimedia data.

For the graphical user interface provided in the embodiment of the present invention, an interaction interface corresponding to multimedia data is displayed, verification information input by a user through the interaction interface is acquired, it is verified whether the verification information is correct, and if the verification information is correct, presentation of the multimedia data is skipped. Because if the user can input the correct verification information, it indicates that the user knows something about the presented multimedia data, and in this case, the user may input the correct verification information to skip presentation of the multimedia data, thereby saving time of the user, and achieving an objective of promoting a relevant product. In addition, not only a manner of controlling presentation of multimedia data becomes more flexible, but also an effect of presenting multimedia data is further enhanced.

It should be noted that when the apparatus for controlling presentation of multimedia data provided in the foregoing embodiments controls presentation of multimedia data, the foregoing division of functional modules is only used as an example for description. In practical applications, the foregoing functions may be allocated to be accomplished by different functional modules according to needs, that is, the internal structure of the apparatus is divided into different functional modules to accomplish all or some of the functions described above. In addition, the apparatus for controlling presentation of multimedia data in the foregoing embodiments share the same concept with the embodiments of the method for controlling presentation of multimedia data and reference may be made to the method embodiments for the specific implementation process of the apparatus, which is no longer elaborated herein.

The sequence numbers of the above embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for controlling presentation of multimedia data, comprising:
    at a terminal having one or more processors and memory storing programs executed by the one or more processors;
    presenting multimedia data;
    displaying an interaction interface corresponding to the multimedia data, comprising:
        acquiring an identifier corresponding to the multimedia data, wherein the identifier corresponding to the multimedia data corresponds to multiple interaction type identifiers indicating multiple interaction types;
        performing a first predetermined local search according to the identifier corresponding to the multimedia data to determine multiple corresponding interaction type identifiers and corresponding topical content and to select, from the multiple corresponding interaction type identifiers, an interaction type identifier and corresponding topical content, such that the selected interaction type identifier of a current time being different from a recorded interaction type identifier of a previous time;
        performing a second predetermined local search according to the selected interaction type identifier to determine an interaction type of the interaction interface corresponding to the selected interaction type identifier; and
        displaying the interaction interface corresponding to the multimedia data according to the interaction type and the corresponding topical content, wherein the interaction type indicates a manner of acquiring user input and a template associated with the interaction type, and the corresponding topical content includes a descriptive element filled into the template at a set position;

acquiring verification information input by a user through the interaction interface; and skipping, if the verification information is correct, presentation of the multimedia data.

2. The method according to claim 1, wherein displaying the interaction interface corresponding to the multimedia data comprises:

displaying, if a touch operation is detected on an interface presenting the multimedia data or a time of presenting the multimedia data reaches a preset time, the interaction interface corresponding to the multimedia data.

3. The method according to claim 1, wherein displaying the interaction interface corresponding to the multimedia data comprises:

displaying a second interaction interface corresponding to the multimedia data, wherein the second interaction interface at least comprises document information for prompting input of speech information; and the acquiring verification information input by the user through the interaction interface comprises:

collecting speech information input of the user, according to the document information in the second interaction interface, and using the speech information as the verification information input through the interaction interface, the speech information being verified to determine whether a topic of the multimedia data is spoken by the user.

4. The method according to claim 1, wherein displaying the interaction interface corresponding to the multimedia data comprises:

displaying a third interaction interface corresponding to the multimedia data, wherein the third interaction interface at least comprises a text box for inputting text information; and the acquiring verification information input by the user through the interaction interface comprises:

acquiring text information input by the user in the text box in the third interaction interface, and using the text information as the verification information input through the interaction interface.

5. The method according to claim 1, wherein displaying the interaction interface corresponding to the multimedia data comprises:

displaying a fourth interaction interface corresponding to the multimedia data, wherein the fourth interaction interface at least comprises document information for prompting input of specified image information; and the acquiring verification information input by the user through the interaction interface comprises:

acquiring image information input, according to the document information in the fourth interaction interface, by the user, and using the image information as the verification information input through the interaction interface.

6. The method according to claim 1, wherein displaying the interaction interface corresponding to the multimedia data comprises:

displaying a fifth interaction interface corresponding to the multimedia data, wherein the fifth interaction interface at least comprises document information prompting photographing of a specified expression; and the acquiring verification information input by the user through the interaction interface comprises:

photographing image data according to the document information displayed in the fifth interaction interface, and using the image data as the verification information input through the interaction interface.

7. The method according to claim 1, wherein displaying the interaction interface corresponding to the multimedia data comprises:

displaying a sixth interaction interface corresponding to the multimedia data, wherein the sixth interaction interface at least comprises document information prompting a body motion; and the acquiring verification information input by the user through the interaction interface comprises:

capturing a body motion of the user triggered according to the document information in the sixth interaction interface, and using the body motion as the verification information input through the interaction interface.

8. The method according to claim 1, after acquiring verification information input by the user through the interaction interface, further comprising:

sending the verification information to a verification server, receiving a verification result of verification on the verification information returned by the verification server, and determining, according to the verification result returned by the verification server, whether the verification information is correct.

9. The method according to claim 1, after acquiring verification information input by the user through the interaction interface, further comprising: comparing the verification information with locally prestored standard information, and determining, according to a comparison result, whether the verification information is correct.

10. The method according to claim 1, after displaying the interaction interface corresponding to the multimedia data, further comprising:

displaying a close option on the interaction interface, and closing, after it is detected that the close option is selected, the interaction interface corresponding to the multimedia data.

11. The method according to claim 1, after skipping the presentation of the multimedia data, further comprising:

closing the interaction interface corresponding to the multimedia data.

12. The method according to claim 1, wherein:
the multiple interaction types including at least two of: document input, speech input, text input, image input, facial expression input, or body motion input.

13. The method according to claim 1, wherein: the interaction type identifier is determined randomly among multiple interaction type identifiers.

14. A terminal, comprising:
one or more processors;
a memory; and
one or more program modules stored in the memory and configured for execution by the one or more processors, wherein the one or more program modules are within an apparatus for controlling presentation of multimedia data, comprising:
a presentation module, configured to present multimedia data;
a display module, configured to display an interaction interface corresponding to the multimedia data, comprising:
acquiring an identifier corresponding to the multimedia data, wherein the identifier corresponding to the multimedia data corresponds to multiple interaction type identifiers indicating multiple interaction types;

performing a first predetermined local search according to the identifier corresponding to the multimedia data to determine multiple corresponding interaction type identifiers and corresponding topical content and to select, from the multiple corresponding interaction type identifiers, an interaction type identifier and corresponding topical content, such that the selected interaction type identifier of a current time being different from a recorded interaction type identifier of a previous time;

performing a second predetermined local search according to the selected interaction type identifier to determine an interaction type of the interaction interface corresponding to the selected interaction type identifier; and displaying the interaction interface corresponding to the multimedia data according to the interaction type and the corresponding topical content, wherein the interaction type indicates a manner of acquiring user input and a template associated with the interaction type, and the corresponding topical content includes a descriptive element filled into the template at a set position;

an acquisition module, configured to acquire verification information input by a user through the interaction interface; and a control module, configured to skip, when the verification information is correct, presentation of the multimedia data.

15. The terminal according to claim 14, wherein the display module is configured to display, if a touch operation is detected on an interface presenting the multimedia data or a time of presenting the multimedia data reaches a preset time, the interaction interface corresponding to the multimedia data.

16. The terminal according to claim 14, wherein the one or more program modules further comprises a transceiver module, configured to, after the acquisition module acquires verification information input by the user through the interaction interface, send the verification information to a verification server, receive a verification result of verification on the verification information returned by the verification server, and determine, according to the verification result returned by the verification server, whether the verification information is correct.

17. The terminal according to claim 14, wherein the one or more program modules further comprises a comparison module, configured to, after the acquisition module acquires verification information input by the user through the interaction interface, compare the verification information with locally prestored standard information, and determine, according to a comparison result, whether the verification information is correct.

18. The terminal according to claim 14, wherein the one or more program modules further comprise a close module, configured to, after the display module displays an interaction interface corresponding to the multimedia data, display a close option on the interaction interface, and close, after it is detected that the close option is selected, the interaction interface corresponding to the multimedia data.

19. The terminal according to claim 18, wherein the close module is further configured to, after the control module skips presentation of the multimedia data, close the interaction interface corresponding to the multimedia data.

20. A non-transitory computer readable storage medium storing computer instructions that, when being executed by a processor, cause the processor to perform:

presenting multimedia data;

displaying an interaction interface corresponding to the multimedia data, comprising:
   acquiring an identifier corresponding to the multimedia data, wherein the identifier corresponding to the multimedia data corresponds to multiple interaction type identifiers indicating multiple interaction types;
   performing a first predetermined local search according to the identifier corresponding to the multimedia data to determine multiple corresponding interaction type identifiers and corresponding topical content and to select, from the multiple corresponding interaction type identifiers, an interaction type identifier and corresponding topical content, such that the selected interaction type identifier of a current time being different from a recorded interaction type identifier of a previous time;
   performing a second predetermined local search according to the selected interaction type identifier to determine an interaction type of the interaction interface corresponding to the selected interaction type identifier; and
   displaying the interaction interface corresponding to the multimedia data according to the interaction type and the corresponding topical content, wherein the interaction type indicates a manner of acquiring user input and a template associated with the interaction type, and the corresponding topical content includes a descriptive element filled into the template at a set position;

acquiring verification information input by a user through the interaction interface; and skipping, if the verification information is correct, presentation of the multimedia data.

* * * * *